UNITED STATES PATENT OFFICE.

HENRY A. CLARK, OF BOSTON, MASSACHUSETTS.

TREATMENT OF VULCANIZED INDIA-RUBBER AND GUTTA-PERCHA.

SPECIFICATION forming part of Letters Patent No. 237,249, dated February 1, 1881.

Application filed December 30, 1880. (No specimens.)

*To all whom it may concern:*

Be it known that I, HENRY A. CLARK, of Boston, in the county of Suffolk and State of Massachusetts, have invented certain new and useful Improvements in Treatment of Waste Vulcanized India-Rubber and Gutta-Percha, of which the following is a full, clear, and exact description.

This invention relates to the treatment of waste vulcanized india-rubber or gutta-percha for the restoration or recovery of same, to be used and vulcanized again in the manufacture of useful goods, such as boots, shoes, belts, &c.; and this invention, in substance, consists in the treatment of waste vulcanized india-rubber or gutta-percha with a vegetable oil, such as palm-oil, and with a resinous matter, such as common resin, either alone or in combination with each other, all substantially as hereinafter described.

In carrying out this invention the waste vulcanized india-rubber or gutta-percha is desulphurized in any suitable manner—as, for instance, by moistening the same with water and subjecting it to steam or other heat, so as to vaporize such moisture, and then, having been dried, it is placed in a suitable heating apparatus—as, for instance, a steam-jacket kettle—and, either before or while under heat, from two (2) to ten (10) per centum of its weight of palm-oil or other vegetable oil (palm-oil, however, being preferable) is added, and then the whole thoroughly heated and mixed together. The desulphurized waste vulcanized india-rubber or gutta-percha and palm-oil, mixed together as aforesaid, is then subjected in any suitable manner to the vapors of turpentine, camphene, or other equivalent materials until it (the waste vulcanized india-rubber or gutta-percha) is devulcanized, when from two (2) to ten (10) per centum of its weight of resinous matter—such as common resin, either in lumps or powdered—is added and the whole subjected to heat until thoroughly incorporated or mixed together, when the material is ready to be put through the calendering or grinding machines and manufactured into articles of utility, the same in substance as with native india-rubber. The palm or other vegetable oil, added substantially as described, softens and opens the desulphurized waste vulcanized india-rubber or gutta-percha and renders it more susceptible to the influence of the vapors of turpentine to devulcanize it, as has been herein stated, and the common resin or other resinous matter used serves to render the restored vulcanized india-rubber or gutta-percha more coherent and the better adapted to be again used.

Although it has been herein stated that the vegetable oil and resinous matter are used separately—that is, the oil used after desulphurization and the resinous matter after devulcanization—they may be combined with the waste vulcanized india-rubber or gutta-percha after the same has been desulphurized and devulcanized; but it is preferable to use these materials in reference to the desulphurization and devulcanization as has been herein described.

Again, either the vegetable oil or resinous matter may be used of itself or without reference to the other material; but it is preferable to use them both.

The restored waste vulcanized india-rubber or gutta-percha, with its palm-oil and resinous matter, if desired, may be rendered soft by means of benzine or other solvent. The vegetable oil and resinous matter adds increased life and activity to the restored waste vulcanized india-rubber or gutta-percha.

Although the devulcanization of the india-rubber or gutta-percha has been herein described as produced by the vaporization of turpentine, it is not intended to limit this invention to any particular mode of devulcanization or desulphurization.

I do not claim, broadly, mixing and treating, in presence of heat, vegetable or mineral oils, gum-resins, or other resinous bodies and sulphur to form an artificial caoutchouc; nor do I claim an artificial caoutchouc made up by combining vegetable or mineral oils, gum-resins, or other resinous bodies and sulphur with india-rubber or gutta-percha; and, further, I make no claim herein to the inventions claimed in applications for patents heretofore filed by me, and upon which Letters Patent have been granted, bearing date January 18, 1881; but,

Having thus described my invention, what I claim, and desire to secure by Letters Patent, is—

The combination, with desulphurized and devulcanized india-rubber or gutta-percha, of a vegetable oil or oils or of a resinous matter or matters, either alone or together, all substantially as herein described, for the purpose specified.

In testimony whereof I have hereunto set my hand in the presence of two subscribing witnesses.

HENRY A. CLARK.

Witnesses:
EDWIN W. BROWN,
W. S. BELLOWS.